(No Model.)
J. COLLINS.
Apparatus for Generating Gas for Mineral Waters.
No. 231,538.          Patented Aug. 24, 1880.
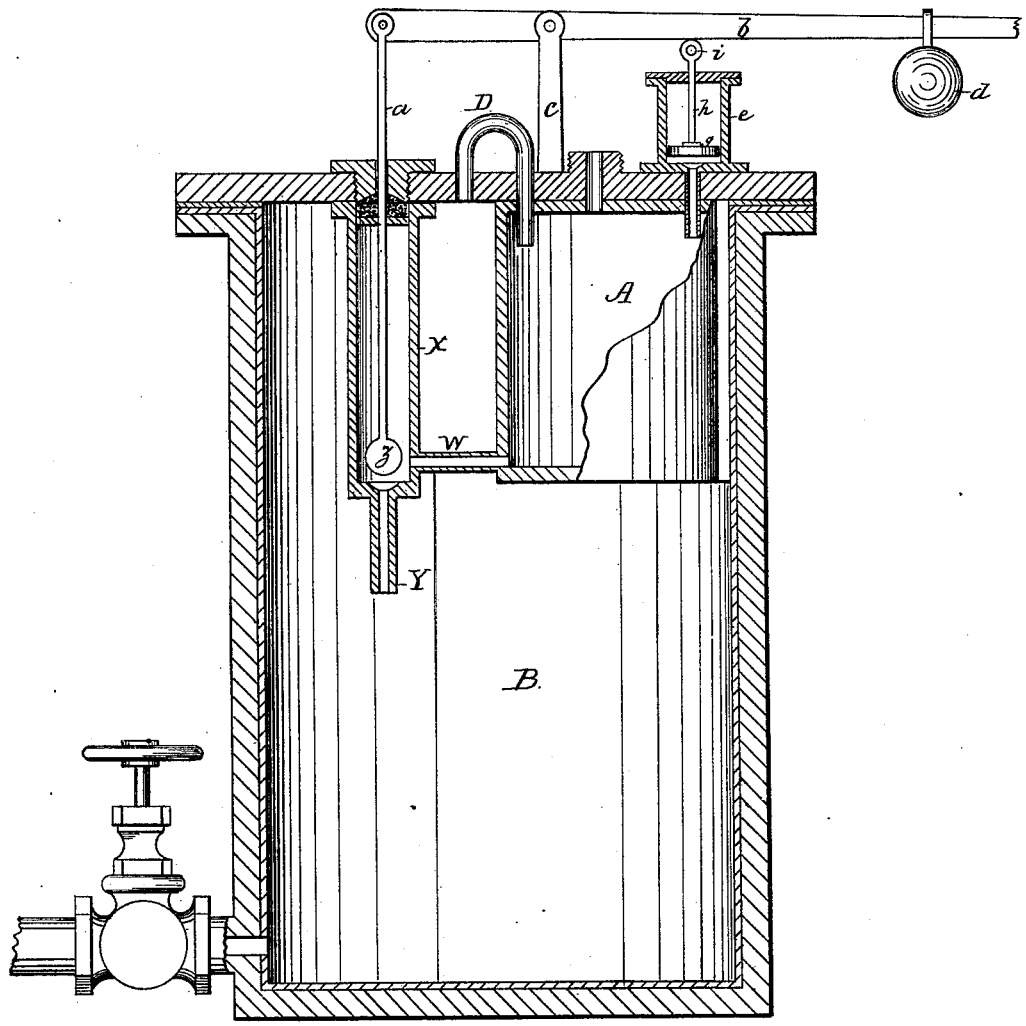
WITNESSES:
W. W. Hollingsworth
Amos W. Hart
INVENTOR:
J. Collins
BY
ATTORNEYS.
N. PETERS, PHOTO-LITHOGRAPHER, WASHINGTON, D. C.

UNITED STATES PATENT OFFICE.

JOHN COLLINS, OF BROOKLYN, NEW YORK.

APPARATUS FOR GENERATING GAS FOR MINERAL WATERS.

SPECIFICATION forming part of Letters Patent No. 231,538, dated August 24, 1880.

Application filed May 24, 1880. (No model.)

*To all whom it may concern:*

Be it known that I, JOHN COLLINS, of Brooklyn, in the county of Kings and State of New York, have invented a new and Improved Apparatus for Generating Gas for Mineral Waters, of which the following is a specification.

The drawing represents a sectional elevation of my apparatus.

My invention is an improvement in that class of carbonic-acid-gas generators in which the discharge of acid into the chamber containing lime or other carbonate is regulated automatically by the variation in the pressure of gas, which acts upon a piston that, in turn, tilts a pivoted lever, and thereby opens a valve that controls the escape of acid from its tank or holder.

In practice, the great desideratum is an apparatus of this class which shall not be liable to get out of order, shall be very compact, or so constructed as to occupy little space, and whose acid-chamber and connected valve-chamber shall be protected from contact with other objects, and thus not be liable to injury in transportation, handling, &c.

I attain these objects by the construction and arrangement of parts hereinafter described, and shown in accompanying drawings.

A represents the acid-cylinder, and B the generating-cylinder, with which are connected the purifying cylinder or cylinders (not shown) and the storage-cylinder (not shown) in the ordinary manner. The acid-cylinder A and valve-chamber X are shown placed within the cylinder B. The upper part of the acid-cylinder A is connected with the upper part of the generating-cylinder B by a pipe, D, so that the gas-pressure may always be the same in both cylinders. The lower part of the acid-cylinder A is connected by a pipe, W, with small cylinder X, also secured to the head of the generating-cylinder B.

The acid flows from the lower part of the said cylinder A through the pipe W into the small cylinder X, and thence through the pipe Y into the lower part of the cylinder B. The discharge-opening in the bottom of the cylinder X is closed by a valve, Z, the stem *a* of which passes out through a hole in the top of the said cylinder X, and is pivoted to the end of a lever, *b*. The lever *b* is pivoted to a stud, *c*, attached to the head of the cylinder B, and upon its outer end is placed a sliding weight, *d*.

To the head of the cylinder B, directly beneath the outer part of the lever *b*, is placed a small cylinder, *e*, through the bottom of which an aperture or short pipe, *f*, leads into the interior of the cylinder B. Within the cylinder *e* is placed a piston, *g*, the piston-rod *h* of which passes out through a hole in the top of the cylinder *e*.

To the upper end of the piston-rod *h* is pivoted a small wheel, *i*, which rests against the lower side of the lever *b*.

With this arrangement, when the gas-pressure within the cylinder B exceeds the point for which the weight *d* has been set the piston *g* is forced upward, which operates the lever *b* and closes the valve Z, stopping the flow of the acid. When the gas-pressure is lessened until the pressure of the weight *d* exceeds the pressure of the gas the said weight *d* forces the piston *g* downward and opens the valve Z, allowing the acid to again flow.

By placing the acid-tank A and valve-cylinder X within the gas-generating cylinder B they are protected from contact with other objects, and hence not liable to injury from such cause; but what is of greater importance, the apparatus is thereby made very compact, so as to occupy much less space than others of its special class. The lever *b* and other connected parts with which it is requisite the acid shall not come in contact are located outside the cylinder B, and attached to the top or cover of said cylinder, so that all may be removed together with the cover.

What I claim is—

The improved apparatus consisting of the gas-generating cylinder B, the acid-tank A, and valve-cylinder X, which are connected at the bottom by pipe W and inclosed within the cylinder B, the weighted lever *b*, the piston *g*, and piston-cylinder *e*, arranged exteriorly and attached to the cover of said cylinder B, and the valve Z, whose stem passes through the head of the latter, all as shown and described, for the purpose specified.

JOHN COLLINS.

Witnesses:
JAMES T. GRAHAM,
C. SEDGWICK.